United States Patent
Olarig et al.

(10) Patent No.: US 10,372,659 B2
(45) Date of Patent: Aug. 6, 2019

(54) MULTI-MODE NMVE OVER FABRICS DEVICES

(71) Applicant: Samsung Electronics Co., Ltd., Suwon-si, Gyeonggi-do (KR)

(72) Inventors: Sompong Paul Olarig, Pleasanton, CA (US); Son T. Pham, San Ramon, CA (US); Fred Worley, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 76 days.

(21) Appl. No.: 15/411,962

(22) Filed: Jan. 20, 2017

(65) Prior Publication Data

US 2018/0032469 A1 Feb. 1, 2018

Related U.S. Application Data

(63) Continuation-in-part of application No. 15/403,088, filed on Jan. 10, 2017, now Pat. No. 10,210,123, and a continuation-in-part of application No. 15/345,507, filed on Nov. 7, 2016, and a continuation-in-part of application No. 15/345,509, filed on Nov. 7, 2016, and a continuation-in-part of application No. 15/256,495, filed on Sep. 2, 2016.

(60) Provisional application No. 62/426,422, filed on Nov. 25, 2016, provisional application No. 62/420,355, filed on Nov. 10, 2016, provisional application No. 62/394,726, filed on Sep. 14, 2016, provisional
(Continued)

(51) Int. Cl.
*G06F 13/20* (2006.01)
*G06F 13/42* (2006.01)
*G06F 13/38* (2006.01)

(52) U.S. Cl.
CPC ........ *G06F 13/4234* (2013.01); *G06F 13/387* (2013.01); *G06F 13/4282* (2013.01); *G06F 2213/0026* (2013.01)

(58) Field of Classification Search
CPC ............. G06F 13/4234; G06F 13/4282; G06F 2213/0026
See application file for complete search history.

(56) References Cited

U.S. PATENT DOCUMENTS 6,295,567 B1 * 9/2001 Bassman ............... G06F 13/409
361/752
6,345,303 B1 2/2002 Knauerhase et al.
(Continued)

FOREIGN PATENT DOCUMENTS

CN 104615577 A 5/2015

OTHER PUBLICATIONS

Fang, Chin, "Using NVMe Gen3 PCIe SSD Cards in High-density Servers for High-performance Big Data Transfer Over Multiple Network Channels", SLAC National Accelerator Laboratory, Stanford University, Stanford, California, Feb. 7, 2015, 17 pages.
(Continued)

*Primary Examiner* — Jing-Yih Shyu
(74) *Attorney, Agent, or Firm* — Renaissance IP Law Group LLP

(57) ABSTRACT

A device may include a connector to connect the device to a chassis. The device may include chassis type circuitry to determine a type of the chassis. The device may further include mode configuration circuitry to configure the device to use a particular mode appropriate for the type of the chassis.

18 Claims, 7 Drawing Sheets

Related U.S. Application Data application No. 62/394,727, filed on Sep. 14, 2016, provisional application No. 62/366,622, filed on Jul. 26, 2016.

(56) References Cited

U.S. PATENT DOCUMENTS

| | | | |
|---|---|---|---|
| 6,611,863 B1 | 8/2003 | Banginwar | |
| 7,143,153 B1 | 11/2006 | Black et al. | |
| 7,536,486 B2 | 5/2009 | Sadovsky et al. | |
| 8,832,327 B1 | 9/2014 | Lin | |
| 8,943,234 B1 | 1/2015 | Voorhees et al. | |
| 8,949,517 B2 | 2/2015 | Cohen et al. | |
| 9,253,275 B2 | 2/2016 | Bhogal et al. | |
| 9,280,357 B2 * | 3/2016 | Shaver | G06F 1/182 |
| 9,389,805 B2 | 7/2016 | Cohen et al. | |
| 9,400,749 B1 | 7/2016 | Kuzmin et al. | |
| 9,785,356 B2 * | 10/2017 | Huang | G06F 3/061 |
| 9,934,173 B1 * | 4/2018 | Sakalley | G06F 13/1673 |
| 10,108,450 B2 | 10/2018 | Pinto et al. | |
| 2005/0025125 A1 * | 2/2005 | Kwan | H04L 63/10 370/352 |
| 2005/0060442 A1 | 3/2005 | Beverly et al. | |
| 2010/0077067 A1 | 3/2010 | Strole | |
| 2010/0100858 A1 | 4/2010 | Schipper | |
| 2010/0106836 A1 | 4/2010 | Schreyer et al. | |
| 2012/0056728 A1 | 3/2012 | Erdmann et al. | |
| 2013/0117503 A1 | 5/2013 | Nellans et al. | |
| 2013/0117766 A1 * | 5/2013 | Bax | G06F 9/4405 719/323 |
| 2013/0242991 A1 | 9/2013 | Basso et al. | |
| 2013/0282953 A1 | 10/2013 | Orme et al. | |
| 2014/0330995 A1 | 11/2014 | Levy et al. | |
| 2015/0006758 A1 | 1/2015 | Holtman et al. | |
| 2015/0039815 A1 | 2/2015 | Klein | |
| 2015/0106660 A1 | 4/2015 | Chumbalkar et al. | |
| 2015/0178095 A1 * | 6/2015 | Balakrishnan | G06F 13/364 710/110 |
| 2015/0254088 A1 | 9/2015 | Chou et al. | |
| 2015/0261434 A1 | 9/2015 | Kagan et al. | |
| 2015/0370665 A1 | 12/2015 | Cannata et al. | |
| 2016/0062936 A1 | 3/2016 | Brassac et al. | |
| 2016/0085718 A1 | 3/2016 | Huang | |
| 2016/0094619 A1 | 3/2016 | Khan et al. | |
| 2016/0127468 A1 | 5/2016 | Malwankar et al. | |
| 2016/0146754 A1 * | 5/2016 | Prasad | G01N 27/447 204/547 |
| 2016/0283428 A1 * | 9/2016 | Guddeti | G06F 13/4027 |
| 2016/0328344 A1 * | 11/2016 | Jose | G06F 13/4022 |
| 2016/0337272 A1 | 11/2016 | Berman | |
| 2017/0068268 A1 * | 3/2017 | Giriyappa | H03L 7/0814 |
| 2017/0168943 A1 * | 6/2017 | Chou | G06F 12/0833 |
| 2017/0262029 A1 * | 9/2017 | Nelson | G06F 1/20 |
| 2017/0269871 A1 * | 9/2017 | Khan | G06F 3/0619 |
| 2017/0344259 A1 * | 11/2017 | Freyensee | G06F 3/061 |
| 2018/0004695 A1 * | 1/2018 | Chu | G06F 13/16 |

OTHER PUBLICATIONS

Non-Final Office Action for U.S. Appl. No. 15/256,495, dated Mar. 29, 2018.
Final Office Action for U.S. Appl. No. 15/256,495, dated Oct. 19, 2018.
Office Action for U.S. Appl. No. 15/345,509, dated Sep. 10, 2018.
Final Office Action for U.S. Appl. No. 15/345,509, dated Feb. 21, 2019.
Notice of Allowance for U.S. Appl. No. 15/345,507, dated Feb. 19, 2019.
NVM Express over Fabrics specification Revision 1.0; NVM Express Inc.; Jun. 5, 2016. (Year: 2016).
Office Action for U.S. Appl. No. 15/345,507, dated Dec. 3, 2018.
Advisory Action for U.S. Appl. No. 15/256,495, dated Feb. 1, 2019.

\* cited by examiner

MULTI-MODE NMVE OVER FABRICS DEVICES

RELATED APPLICATION DATA

This application is a continuation-in-part of U.S. patent application Ser. No. 15/256,495, filed Sep. 2, 2016, which claims the benefit of U.S. Provisional Patent Application Ser. No. 62/366,622, filed Jul. 26, 2016, both of which are incorporated by reference herein for all purposes.

This application claims the benefit of U.S. Provisional Patent Application Ser. No. 62/426,422, filed Nov. 25, 2016, which is incorporated by reference herein for all purposes.

This application is a continuation-in-part of U.S. patent application Ser. No. 15/345,507, filed Nov. 7, 2016, which claims the benefit of U.S. Provisional Patent Application Ser. No. 62/394,726, filed Sep. 14, 2016

This application is a continuation-in-part of U.S. patent application Ser. No. 15/345,509, filed Nov. 7, 2016, which claims the benefit of U.S. Provisional Patent Application Ser. No. 62/394,727, filed Sep. 14, 2016, all of which are incorporated by reference herein for all purposes.

This application is a continuation-in-part of U.S. patent application Ser. No. 15/403,088, filed Jan. 10, 2017, which claims the benefit of U.S. Provisional Patent Application Ser. No. 62/366,622, filed Jul. 26, 2016, and which claims the benefit of U.S. Provisional Patent Application Ser. No. 62/420,355, filed Nov. 10, 2016, all of which are incorporated by reference herein for all purposes.

FIELD

The inventive concepts relate generally to computer devices, and more particularly to computer devices that may support multiple modes for different chassis configurations.

BACKGROUND

Conventional chassis come in a variety of different models. For example, some chassis use Non-Volatile Memory Express (NVMe) to communicate with devices, while other chassis use Non-Volatile Memory Express over Fabrics (NVMeoF) to communicate with devices. Different models of chassis may require different models of devices designed to interoperate with those models. As a consequence, device manufacturers need to provide different models of devices. In addition, data centers that use those different models of chassis have to keep spare parts of the different devices in case of device failures, which means the data centers need to keep more spare parts than they might otherwise like to stock.

A need remains for a way for to reduce the number of device types produced by manufacturers and stocked by data centers.

DETAILED DESCRIPTION

Figure 1:
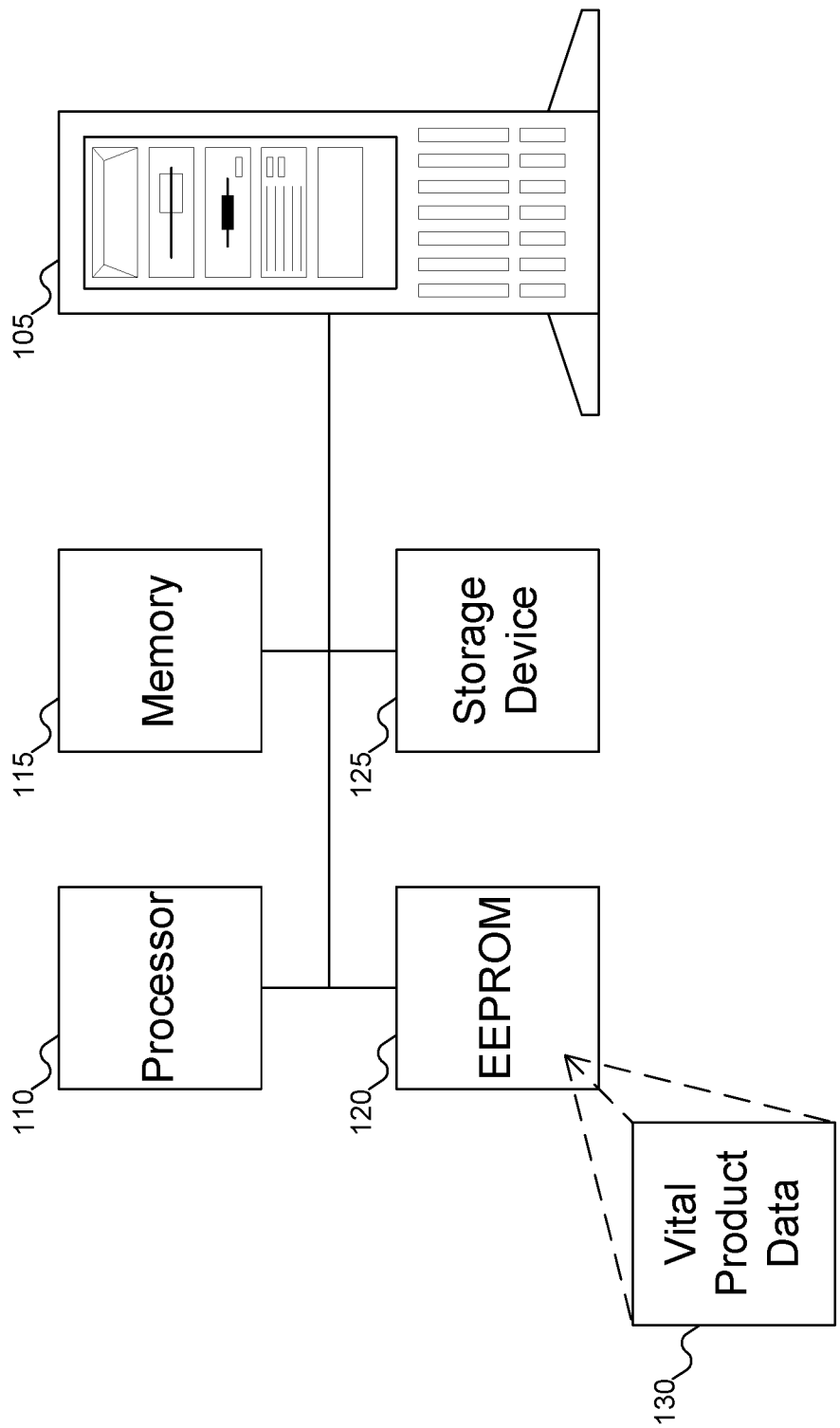
FIG. 1 shows a machine with a device, according to an embodiment of the inventive concept.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

It is desirable for Non-Volatile Memory Express over Fabrics (NVMeoF) device suppliers to offer a single common device which may be used in multiples products such as Non-Volatile Memory Express (NVMe) chassis and NVMeoF chassis. In addition, it is also desirable to have a common system platform which is capable of supporting NVMe and NVMeoF devices in non-High Availability, or single path input/output (I/O), and High Availability, or multi-path I/O, modes with minimum changes.

The multi-mode NVMeoF device may support either NVMe or NVMeoF by detecting information from a known location. If the multi-mode device is installed in an NVMe chassis, or if the chassis type may not be determined, then the X4 lanes of the Peripheral Component Interconnect Express (PCIe) may be used for both data and control communication. The device may be driven by a PCIe engine, enabling communication over (for example) a U.2 connector. In this case, the device will disable the Ethernet engine(s), and all NVMe protocols and functionalities are supported or enabled.

If the multi-mode device is installed in an NVMeoF chassis, then two of the PCIe lanes may be used for control communication. Ethernet ports, which support data communication, may use other available PCIe lanes or Serial Attached Small Computer System Interface (SCSI) (SAS) pins, depending on the design of the device.

Embodiments of the inventive concept enable multi-mode devices to push health status, field replaceable unit (FRU) information, sensor information, and discovery services to the Baseboard Management Controller (BMC) or local host processor. Multi-mode devices may also download NVMeoF device firmware upgrades.

High Availability multipath I/O support is also available, although the multi-mode device then needs to support data and control communication with two (or potentially more) hosts. This may require allocating more communication paths (e.g., additional Ethernet ports over additional SAS pins) or dividing the available communication paths (e.g., allocating different PCIe lanes for different purposes).

Embodiments of the inventive concept may support different designs. In some designs, a common multi-mode device may support two distinct modes: NVMe and NVMeoF. In addition, in some designs, in NVMe mode the multi-mode device may behave like a conventional NVMe device. In one design, the multi-mode device may use some PCIe lanes for control communication and some PCIe lanes for Ethernet ports. In another design, the multi-mode device may use some PCIe lanes for control communication and SAS pins for Ethernet ports. Conventional PCIe software drivers may be used to manage PCIe communication in some designs.

FIG. 1 shows a chassis with a device, according to an embodiment of the inventive concept. In FIG. 1, chassis 105 is shown. Chassis 105 may be any desired chassis, including without limitation a desktop or laptop computer, a server (either a standalone server or a rack server), or any other device that may benefit from embodiments of the inventive concept. Chassis 105 may also include specialized portable computing devices, tablet computers, smartphones, and other computing devices. And while the described embodiments of the inventive concept refer to storage devices such as Ethernet Solid State Drives (eSSDs), embodiments of the inventive concept may be applied to any form of device that may benefit from the separation of the data and control planes.

Chassis 105, regardless of its specific form, may include processor 110, memory 115, Electrically Erasable Programmable Read-Only Memory (EEPROM) 120, and storage device 125. Processor 110 may be any variety of processor: for example, an Intel Xeon, Celeron, Itanium, or Atom processor, an AMD Opteron processor, an ARM processor, etc. While FIG. 1 shows a single processor, chassis 105 may include any number of processors. Memory 115 may be any variety of memory, such as flash memory, Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc., but is typically DRAM. Memory 115 may also be any desired combination of different memory types.

EEPROM 120 may store Vital Product Data (VPD) 130. Vital Product Data 130 may be data used by storage device 125 to configure itself. For example, Vital Product Data 130 may store information about chassis 105 or about the transport protocol intended to be used to communicate with storage device 125. Example transport protocols that may be used to communicate with storage device 125 may include Ethernet, Fibre Channel, InfiniBand, or Non-Volatile Memory Express (NVMe), to name a few. Vital Product Data 130 may also store information about transport sub-protocols used. For example, if Vital Product Data 130 specifies that the Ethernet transport protocol is to be used, Vital Product Data 130 may store whether to use Remote Direct Memory Access (RDMA) over Converged Ethernet (RoCE) or iWarp, among other possibilities.

While FIG. 1 shows Vital Product Data 130 as being stored within EEPROM 120, embodiments of the inventive concept may support using any alternative storage mediums. For example, EEPROM 120 may be replaced with an Erasable Programmable Read Only Memory (EPROM) or flash memory, to name a few alternatives.

Storage device 125 may be any variety of storage device. Examples of such devices may include Solid State Drives (SSDs), but other storage forms, such as hard disk drives or other long-term storage devices, are also viable. In addition, memory 115 and storage device 125 may be combined: that is, embodiments of the inventive concept might not distinguish between the concepts of short-term and long-term storage, but manage both in a single form factor. Storage device 125 may also be generalized to any device that may benefit from embodiments of the inventive concept: the use of storage device 125 is merely a simplification for descriptive purposes.

Figure 2:
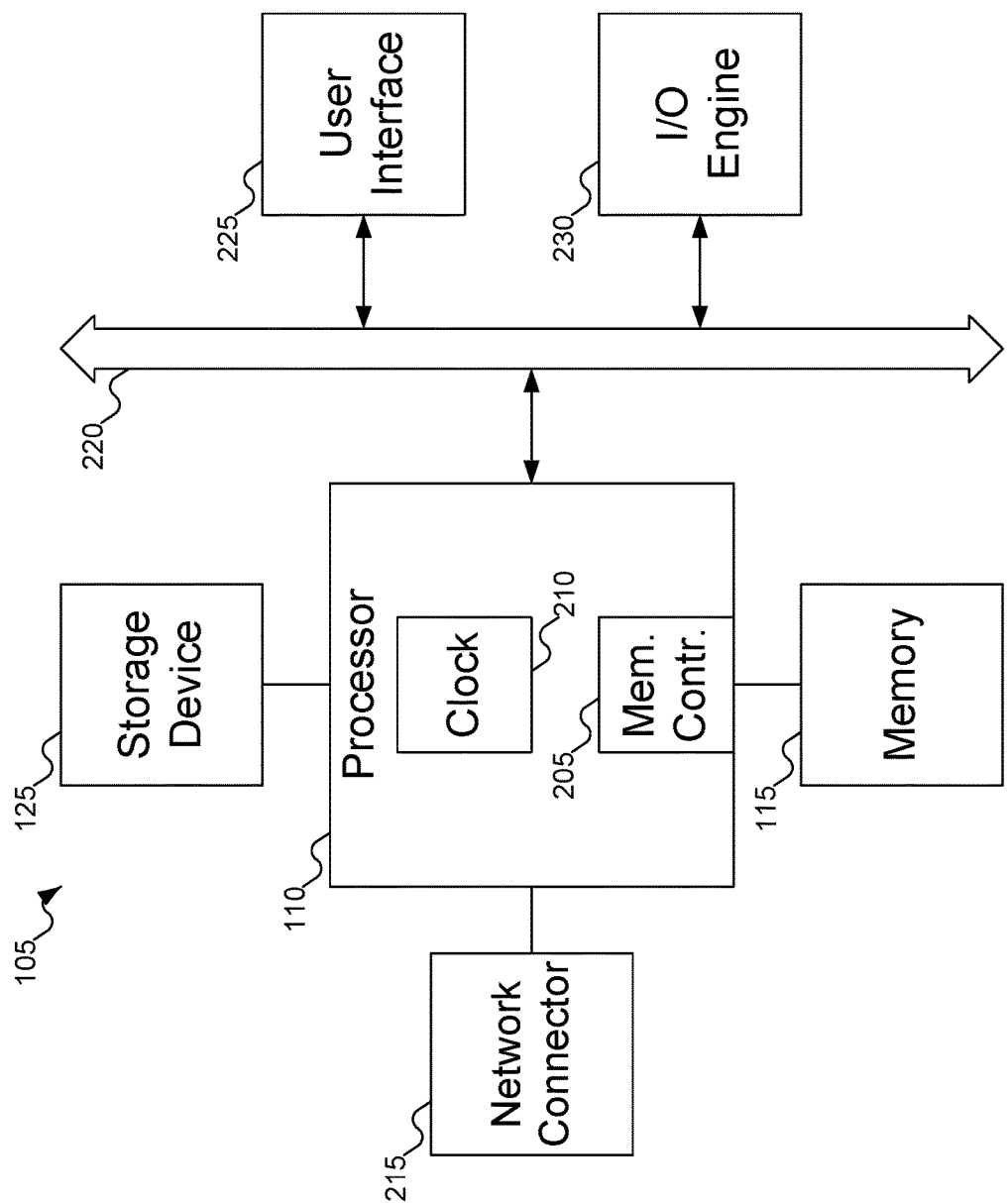
FIG. 2 shows additional details of the machine of FIG. 1.

FIG. 2 shows additional details of the chassis of FIG. 1. Referring to FIG. 2, typically, chassis 105 includes one or more processors 110, which may include memory controller 205 and clock 210, which may be used to coordinate the operations of the components of chassis 105. Processors 110 may also be coupled to memory 115, which may include random access memory (RAM), read-only memory (ROM), or other state preserving media, as examples. Processors 110 may also be coupled to storage devices 125, and to network connector 215, which may be, for example, an Ethernet connector or a wireless connector. Processors 110 may also be connected to a bus 220, to which may be attached user interface 225 and input/output interface ports that may be managed using input/output engine 230, among other components.

Figure 3:
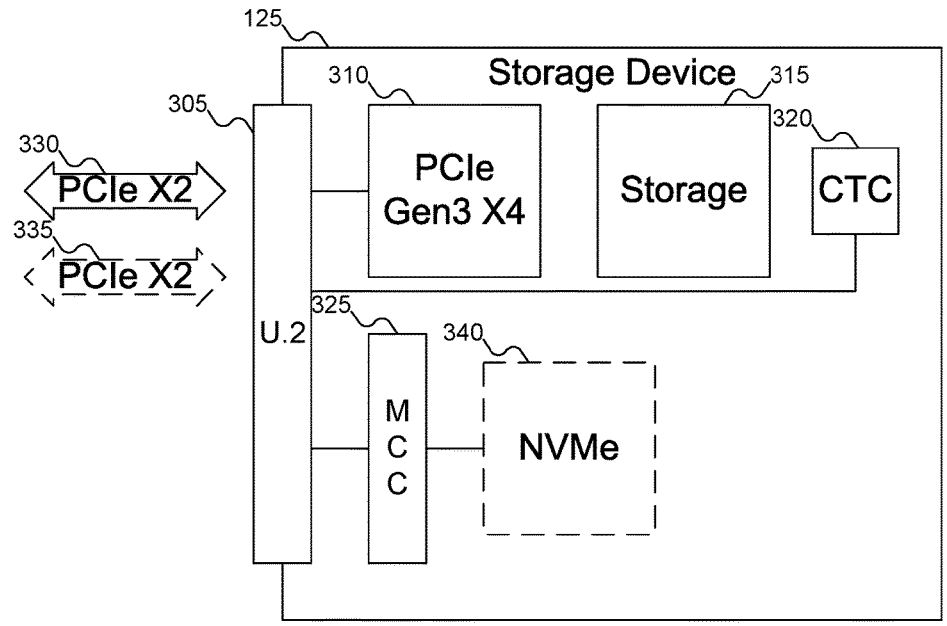
FIGS. 3-4 show the device of FIG. 1 operating in either Non-Volatile Memory Express (NVMe) or Non-Volatile Memory Express over Fabrics (NVMeoF) mode.
Figure 4:
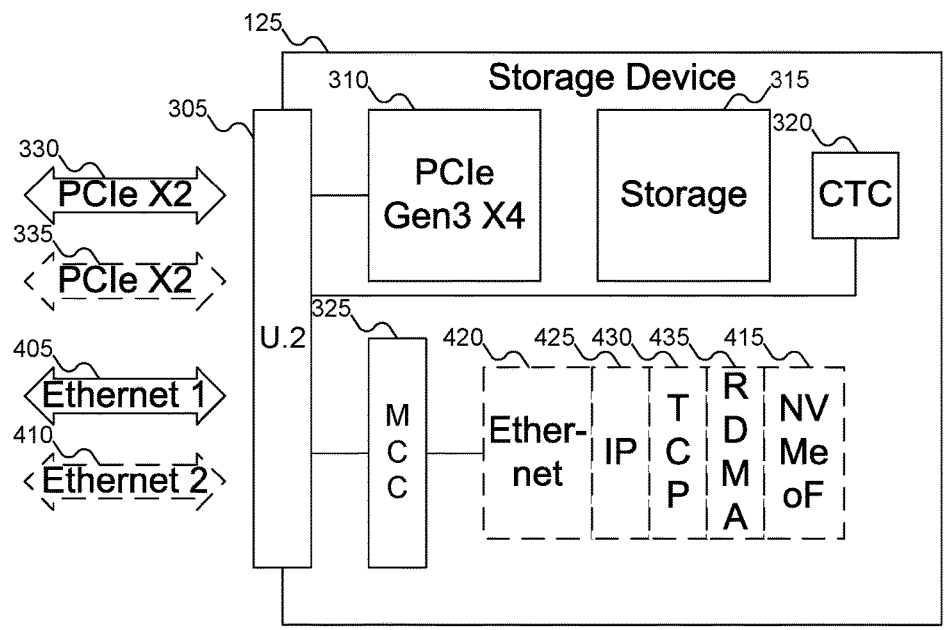

FIGS. 3-4 show storage device 125 of FIG. 1 operating in either Non-Volatile Memory Express (NVMe) or Non-Volatile Memory Express over Fabrics (NVMeoF) mode. In FIG. 3, storage device 125 is shown as including U.2 connector 305, PCIe Gen3 X4 chip 310, storage 315, chassis type circuitry 320, and mode configuration circuitry 325. U.2 connector 305 is a particular variety of connector that may be used on devices such as storage device 125. U.2 connector 305 may support a number of different interfaces, with support for PCIe, Serial Attached Small Computer System Interface (SCSI) (SAS), and Serial AT Attachment (SATA) built in. While FIGS. 3-4 show the use of U.2 connector 305, U.2 connector 305 may be replaced with alternative connectors, provided that the alternative connectors may support communications in a manner consistent with embodiments of the inventive concept. The use of U.2 connector 305 has some advantages over other connectors, as U.2 connector supports up to four lanes of PCIe communication and provides for alternative communication channels such as SAS as well.

PCIe Gen3 X4 chip 310 is a chip that manages the PCIe communications over the PCIe bus. PCIe Gen3 X4 chip 310 may be replaced with any comparable chip that may manage communications, and is not limited to using the PCIe bus, although the comparable chip needs to be compatible with the communication methods offered by the connector. For example, a chip that does not manage PCIe communications may not work with the U.2 connector. The combination of U.2 connector 305 and PCI Gen3 X4 chip 310 has an advantage in that the combination may take full advantage of the four lanes of the PCIe bus available via U.2 connector 305.

Storage 315 may be any storage format desired. For example, storage 315 may be flash memory, or storage 315 may be a hard disk drive, among other possibilities. Embodiments of the inventive concept are not limited to a particular storage format. Of course, if storage device 125 is replaced with some other type of device, then storage 315 may be replaced with some other functionality appropriate to the other type of device.

Chassis type circuitry 320 may interrogate chassis 105 of FIG. 1 to determine the type of chassis 105 of FIG. 1. In one embodiment of the inventive concept, chassis 105 of FIG. 1 may be either a High Availability chassis or not, and chassis 105 of FIG. 1 may use either NVMe protocol or NVMeoF protocol to communicate with devices such as storage device 125. Thus, in such an embodiment of the inventive concept, chassis 105 of FIG. 1 may take any of four different types. Other embodiments of the inventive concept may also consider other possible types for chassis 105 of FIG. 1.

Chassis type circuitry 320 may perform this interrogation in any desired manner. In one embodiment of the inventive concept, chassis type circuitry 320 may read information from VPD 130 of FIG. 1: VPD 130 of FIG. 1 may specify the type of chassis 105 of FIG. 1. In another embodiment of the inventive concept, chasses type circuitry 320 may access a signal on one or more pins of U.2 connector 305: this signal may specify the type of chassis 105 of FIG. 1. For example, a low signal on one pin—such as pin E25 (Dual-Port En#) of U.2 connector 305—could identify chassis 105 of FIG. 1 as a High Availability chassis, where as a high signal on that pin could identify chassis 105 of FIG. 1 as not being a High Availability chassis. Signals on a second pin could be used in parallel to specify whether chassis 105 of FIG. 1 uses NVMe protocol or NVMeoF protocol. These pins may be, for example, general purpose input/output (GPIO) pins in U.2 connector 305, not otherwise used. These pins may also be any pins not within U.2 connector 305, but rather pins somewhere else within chassis 105 of FIG. 1. As long as storage device 125 may read the signals on the pins, their location is not important. Other embodiments of the inventive concept may have chassis type circuitry 320 determine the type of chassis 105 of FIG. 1 in other ways.

In some embodiments of the inventive concept, storage device 125 might be placed in a legacy chassis: that is, a chassis that is not designed to inform storage device 125, either directly or indirectly, about its type. If chassis type circuitry 320 may not determine the type of chassis 105 of FIG. 1, then chassis type circuitry may default to a particular mode: for example, to configure storage device 125 to use the NVMe protocol and to assume that chassis 105 of FIG. 1 is not a High Availability chassis.

Once chassis type circuitry 320 has determined the type of chassis 105, mode configuration circuitry 325 may configure storage device 125 to use the appropriate protocols and to disable unneeded protocols. For example, if chassis type circuitry 320 indicates that chassis 105 is an NVMe chassis, then mode configuration circuitry 325 may configure storage device 125 to use the NVMe protocol.

In one embodiment of the inventive concept, using the NVMe protocol means that the PCIe lanes of U.2 connector 305 are used for both the data and control planes. If chassis 105 of FIG. 1 is a High Availability chassis, then mode configuration circuitry 325 may partition the PCIe lanes into two sets: one set used for communicating with one host, and the other set used for communicating with the other host. For example, lanes 0 and 1 (shown as PCIe X2 330) may be allocated for communicating with the first host, and lanes 2 and 3 (shown as PCIe X2 335) may be allocated for communicating with the second host. Since the NVMe protocol does not use Ethernet, mode configuration circuitry 325 may "disable" the Ethernet ports on U.2 connector 305. If chassis 105 of FIG. 1 is not a High Availability chassis, then mode configuration circuitry 325 may either use all four PCIe lanes for the data and control planes, or just two PCIe lanes (as though the other two PCIe lanes were reserved for communicating with another host). More generally, embodiments of the inventive concept support using any number of lanes for communicating with any number of hosts. For example, if a connector that supports a given number of lanes (which might be more than four, as with U.2 connector 305) is used, those lanes may be used for communicating with various hosts in any allocation desired. For example, all lanes might be allocated to a single host in a non-High Availability chassis, or lanes might be allocated (either equally or unequally) for communicating with the various hosts. In addition, all lanes might be allocated, or only a subset of the available lanes might be allocated.

In another embodiment of the inventive concept, using the NVMeoF protocol means that the PCIe lanes of U.2 connector 305 are used for the control plane only: Ethernet ports are used for the data plane. If chassis 105 of FIG. 1 is a High Availability chassis, then mode configuration circuitry 325 may partition the PCIe lanes into two sets: one set used for communicating with one host, and the other set used for communicating with the other host. For example, lanes 0 and 1 (shown as PCIe X2 330) may be allocated for communicating with the first host, and lanes 2 and 3 (shown as PCIe X2 335) may be allocated for communicating with the second host. But data is communicated over Ethernet ports, which may be established via, for example, the SAS pins on U.2 connector 305. Different Ethernet ports may be established on different SAS pins for the different hosts. So Ethernet port 405 may be used to communicate data with the first host, and Ethernet port 410 may be used to communicate data with the second host. Since the NVMeoF protocol does not use the PCIe lanes for the data plane, mode configuration circuitry 325 may "disable" the PCIe lanes on U.2 connector 305 for data (although the PCIe lanes are still used for the control plane). If chassis 105 of FIG. 1 is not a High Availability chassis, then mode configuration circuitry 325 may either use all four PCIe lanes for the control plane, or just two PCIe lanes (as though the other two PCIe lanes were reserved for communicating with another host). Mode configuration circuitry 325 may also establish just one Ethernet port or multiple Ethernet ports for communicating with the one host, and theoretically any number of SAS pins may be allocated to any Ethernet port.

Mode communication circuitry 325 may be implemented in any desired manner. A simple approach is for mode communication circuitry 325 to be a demultiplexer. The information received from chassis type circuitry 320 may be a control signal to the demultiplexer, which may then be used to select a particular destination for the signal: PCIe lanes or Ethernet ports. A more complicated approach would be to include both NVMe protocol circuitry 340 and NVMeoF protocol circuitry 415, and to use mode configuration circuitry 325 to direct signals to the appropriate circuitry. In that manner, embodiments of the inventive concept may support any intermediary processing on the signals before the signals are delivered to the appropriate pins on U.2 connector 305.

Typically, chassis type circuitry 320 determines the type of chassis 105 of FIG. 1 at boot up, although embodiments of the inventive concept that support hot plugging may determine the type of chassis 105 of FIG. 1 at the time the device is plugged in to chassis 105 of FIG. 1. That is, when storage device 125 powers up, chassis type circuitry 320 determines the type of chassis 105 of FIG. 1, and mode configuration circuitry 325 configures storage device 125. Storage device 125 then maintains its configuration until it is powered down or rebooted. But in some embodiments of the inventive concept, if chassis 105 of FIG. 1 changes its configuration, chassis type circuitry 320 may determine this fact (for example, by sensing a change in the signals on the pins in U.2 connector 305, by periodically checking VPD 130 of FIG. 1, or by receiving a signal from some component of chassis 105 of FIG. 1—for example, a Baseboard Management Controller—to check for a change in VPD 130 of FIG. 1 or in the signal). Chassis type circuitry 320 may then signal mode configuration circuitry 325 to change the mode of storage device 125. This might involve rebooting storage device 125 for the new mode to take effect.

In FIG. 4, additional components are shown: specifically, Ethernet 420, Internet Protocol 425, Transmission Control Protocol 430, and Remote Direct Memory Access 435. Together, Ethernet 420, Internet Protocol 425, Transmission Control Protocol 430, Remote Direct Memory Access 435, and NVMeoF protocol 415 form a fabric-attached engine. These components may be replaced or supplemented as appropriate to the implementation. For example, if it is desirable to support other protocols than Ethernet (such as InfiniBand or Fibre Channel), additional software may be used in addition to or instead of Ethernet 420 in the fabric-attached engine.

Figure 5:
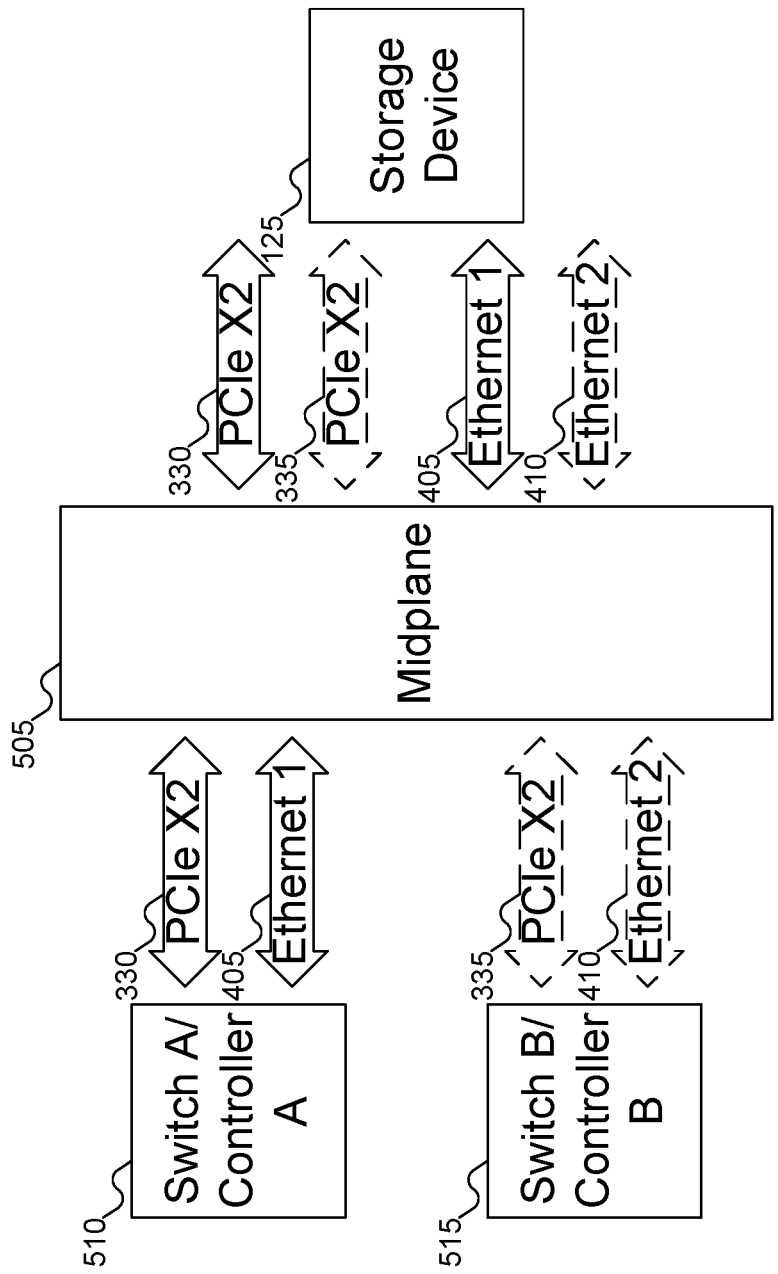
FIG. 5 shows the device of FIG. 1 communicating with two hosts in a High Availability chassis.

FIG. 5 shows the device of FIG. 1 communicating with two hosts in a High Availability chassis. In FIG. 5, storage device 125, PCIe X2 lanes 330 and 335, and Ethernet ports 405 and 410 are shown. These data and control planes may communicate with midplane 505. Midplane 505 may then direct the data to the appropriate host. Thus, host 510 may receive communications from PCIe X2 lanes 330 and Ethernet port 405, while host 515 may receive communications from PCIe X2 lanes 335 and Ethernet ports 410.

FIG. 5 shows storage device 125 using NVMeoF protocol 415 of FIG. 4 to communicate with two hosts in a High Availability chassis. If storage device 125 were using NVMe protocol 340 instead, then Ethernet ports 405 and 410 would not be shown; and if the chassis were not a High Availability chassis, then PCIe lanes 335 and Ethernet port 410 could be disabled or not shown in the drawing (although those communication channels could be used to provide an additional communication channel to host 510).

Aside from being self-configuring and capable of supporting multiple modes, storage device 125 of FIGS. 1-5 may also send information of value to the system. For example, storage device 125 may send information about its health status, field-replaceable unit (FRU) information, sensor information, and/or discovery services. For example, storage device 125 may report information about its health, such as how efficiently storage device 125 is operating. This information may be global across storage device 125, or it may be more focused. For example, storage device 125 may report that, for a particular region of its storage 315 of FIGS. 3-4, it is only "17.3% OK". FRU information may inform chassis 105 of FIG. 1 about the status of any particular FRU (be it EEPROM 120 of FIG. 1, a switchboard, a memory module, a processor, a Baseboard Management Controller (BMC), or any other field replaceable unit. Sensor information may include, for example, information about a temperature sensor within storage device 125, which a BMC may then use to adjust cooling within chassis 105 of FIG. 1. Discovery services include those described in related U.S. patent application Ser. No. 15/345,507, filed Nov. 7, 2016, which claims the benefit of U.S. Provisional Patent Application Ser. No. 62/394,726, filed Sep. 14, 2016, both of which are incorporated by reference herein for all purposes.

Storage device 125 may also support firmware updates. In embodiments of the inventive concept, the BMC in chassis 105 (or another chassis to which storage device 125 may communicate) may download or receive an updated firmware. The BMC may then communicate with storage device 125, verify that the firmware update is compatible with storage device 125, and upgrade the firmware in storage device 125 using the firmware update. This firmware update may be done as a background process. In particular, when storage device 125 is operating using NVMeoF protocol 415 of FIG. 4, this firmware update may be done using the control plane, thereby avoiding any delays for applications using data on storage device 125.

Figure 6:
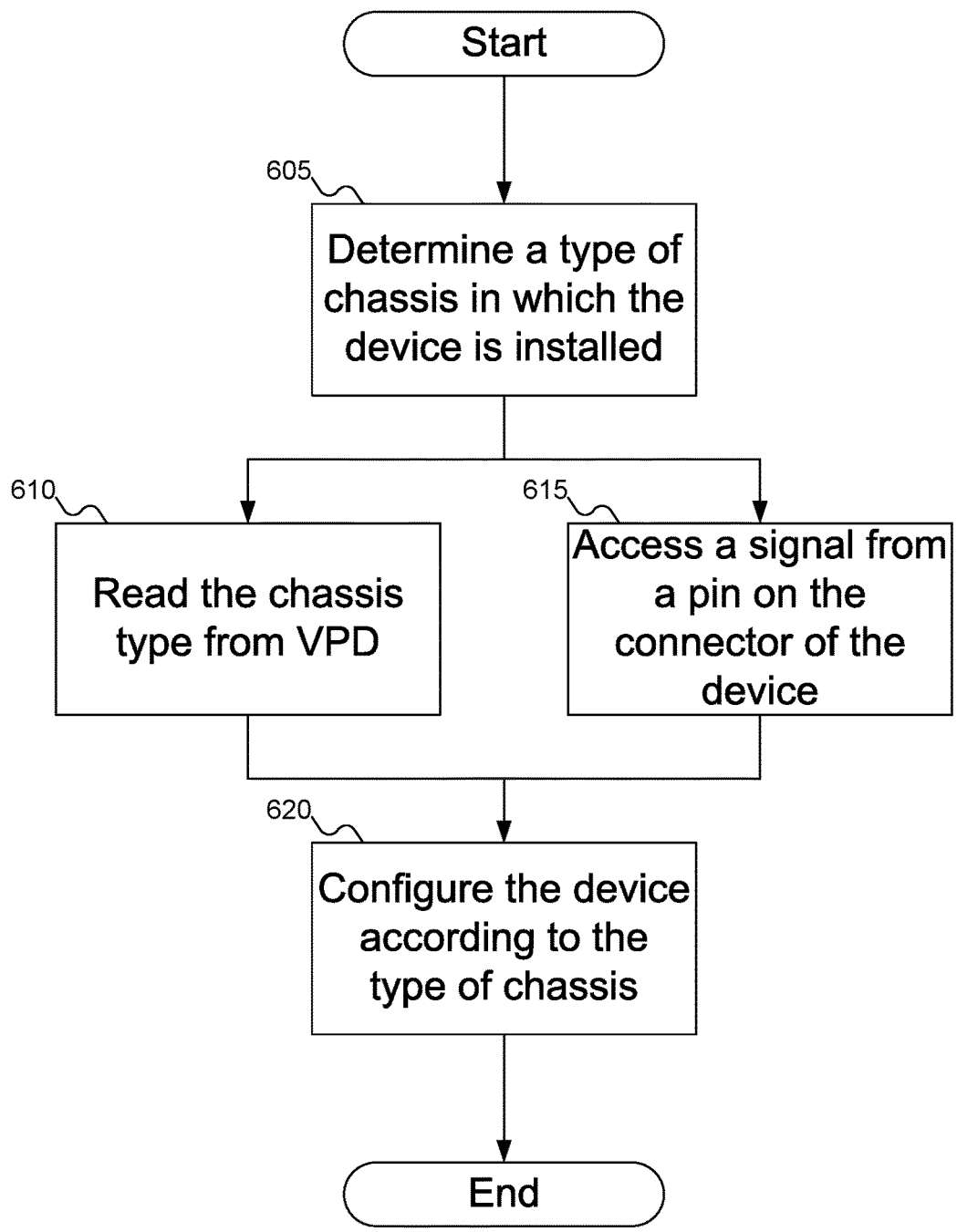
FIG. 6 shows a flowchart of an example procedure for the device of FIG. 1 to self-configure, according to an embodiment of the inventive concept.

FIG. 6 shows a flowchart of an example procedure for storage device 125 of FIG. 1 to self-configure, according to an embodiment of the inventive concept. In FIG. 6, at block 605, storage device 125 of FIG. 1 may determine the type of chassis 105 of FIG. 1. In some embodiments of the inventive concept, this may involve determining whether chassis 105 of FIG. 1 is a High Availability chassis or not, and/or whether chassis 105 of FIG. 1 uses NVMe protocol 340 of FIG. 3 or NVMeoF protocol 415 of FIG. 4 for communication. This determination may be performed by reading the type of chassis 105 of FIG. 1 from VPD 130 of FIG. 1, as shown in block 610, or by accessing a signal from one or more pins (such as GPIO pins) from U.2 connector 305 of FIG. 3, as shown in block 615, among other possibilities. Finally, at block 620, storage device 125 of FIG. 1 may self-configure: an example of this procedure is shown in more detail in FIGS. 7A-7B below.

Figure 7A:
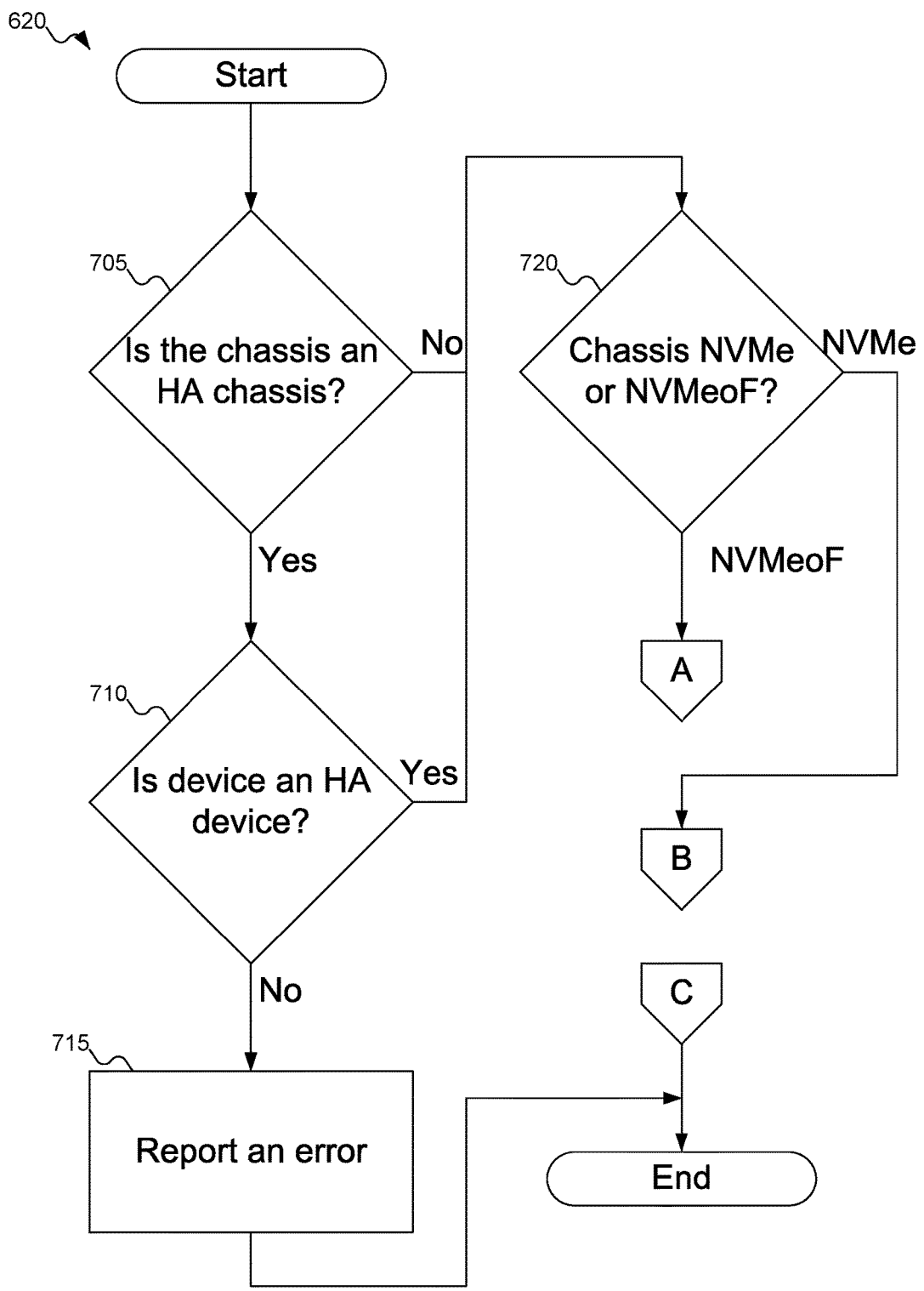
FIGS. 7A-7B show a flowchart of an example procedure for the device of FIG. 1 to self-configure for either NVMe or NVMeoF protocols and either a High Availability chassis or a non-High Availability chassis, according to an embodiment of the inventive concept.
Figure 7B:
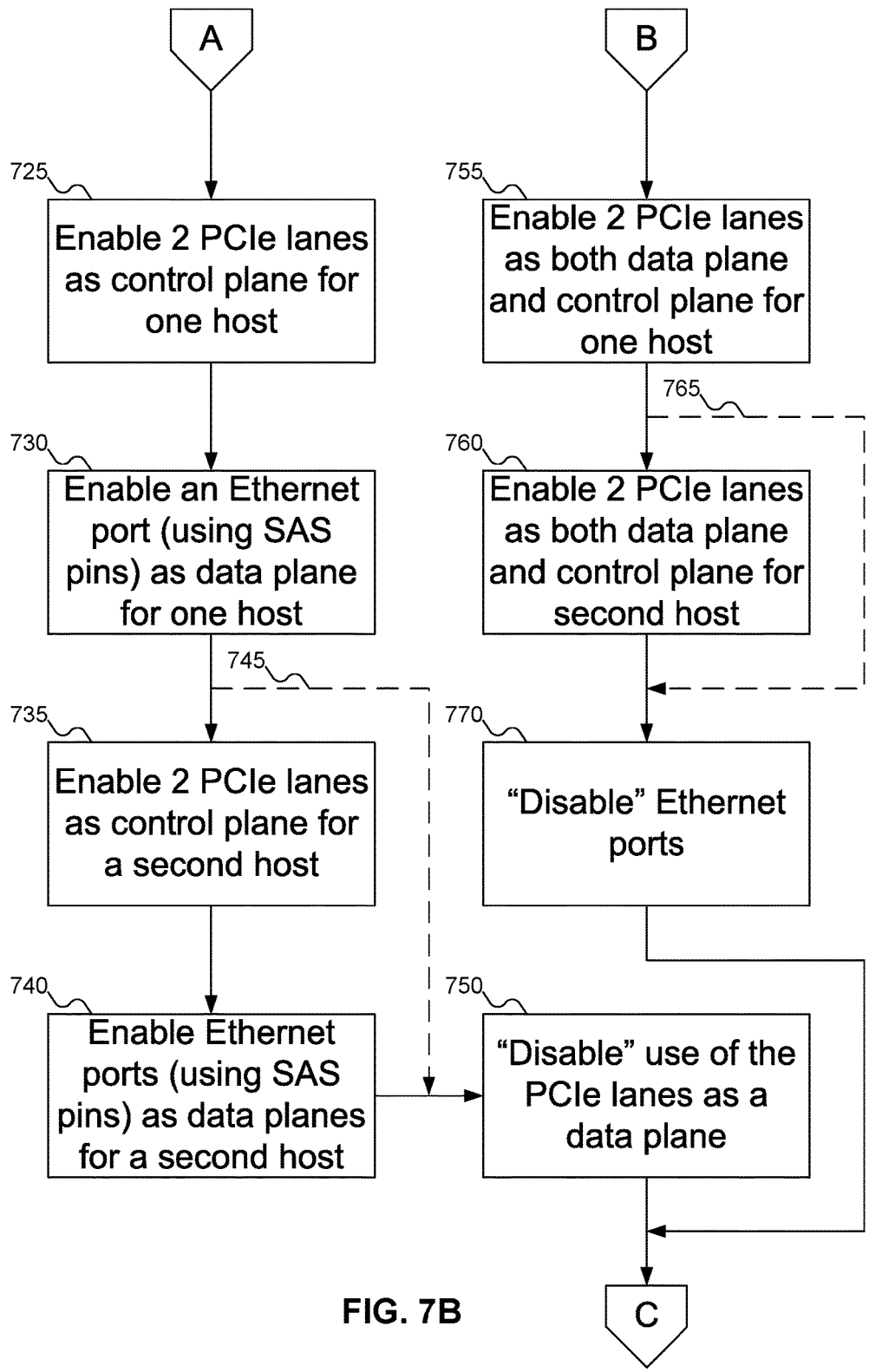

FIGS. 7A-7B show a flowchart of an example procedure for storage device 125 of FIG. 1 to self-configure for either NVMe protocol 340 of FIG. 3 or NVMeoF protocol 415 of FIG. 4, and either a High Availability chassis or a non-High Availability chassis, according to an embodiment of the inventive concept. In FIG. 7A, at block 705, storage device 125 of FIG. 1 may determine whether chassis 105 of FIG. 1 is a High Availability chassis. If so, then at block 710, storage device 125 of FIG. 1 may determine if it is a High Availability storage device. If chassis 105 of FIG. 1 is a High Availability chassis but storage device 125 of FIG. 1 is not a High Availability storage device, then at block 715 storage device 125 of FIG. 1 may report a warning (since a single port device might not operate correctly in a dual port chassis), after which processing may end.

On the other hand, if storage device 125 of FIG. 1 may operate in chassis 105 of FIG. 1, then at block 720 storage device 125 of FIG. 1 may determine the type of chassis 105 of FIG. 1. In the embodiment of the inventive concept shown in FIGS. 7A-7B, the type of chassis is either NVMe protocol 340 of FIG. 3 or NVMeoF protocol 415 of FIG. 4; if the type of chassis 105 of FIG. 1 may not be determined (e.g., chassis 105 of FIG. 1 is a legacy chassis that does not provide this information), then NVMe protocol 340 of FIG. 3 is assumed.

If chassis 105 of FIG. 1 uses NVMeoF protocol 415 of FIG. 4, then at block 725 (FIG. 7B), storage device 125 of FIG. 1 may enable two (or more) PCIe lanes as the control plane for communicating with one host, and at block 730, storage device 125 of FIG. 1 may enable one or more Ethernet ports as the data plane for communicating with the host. At block 735, storage device 125 of FIG. 1 may enable two (or more) additional PCIe lanes as the control plane for communicating with a second host (for example, if chassis 105 of FIG. 1 is a High Availability chassis), and at block 740, storage device 125 of FIG. 1 may enable one or more additional Ethernet ports as the data plane for communicating with the second host. The Ethernet ports may be run over, for example, SAS pins on U.2 connector 305 of FIG. 3. Blocks 735 and 740 may be omitted if chassis 105 of FIG. 1 and storage device 125 of FIG. 1 are not High Availability, as shown by dashed arrow 745. Finally, at block 750, storage device 125 of FIG. 1 may "disable" (by not enabling) the use of lanes on the PCIe bus as the data plane on storage device 125 of FIG. 1.

On the other hand, if chassis 105 of FIG. 1 uses NVMe protocol 340 of FIG. 3, then at block 755, storage device 125 of FIG. 1 may enable two (or more) lanes of the PCIe bus for use as both the data plane and the control plane with one host. At block 760, storage device 125 of FIG. 1 may enable two (or more) lanes of the PCIe bus for use as both the data plane and the control plane with a second host (for example, if chassis 105 of FIG. 1 is a High Availability chassis). Block 760 may be omitted if chassis 105 of FIG. 1 and storage device 125 of FIG. 1 are not High Availability, as shown by dashed arrow 765. Finally, at block 770 storage device 125 of FIG. 1 may "disable" (by not enabling) any Ethernet ports on storage device 125 of FIG. 1.

In FIGS. 6-7B, some embodiments of the inventive concept are shown. But a person skilled in the art will recognize that other embodiments of the inventive concept are also possible, by changing the order of the blocks, by omitting blocks, or by including links not shown in the drawings. All such variations of the flowcharts are considered to be embodiments of the inventive concept, whether expressly described or not.

The following discussion is intended to provide a brief, general description of a suitable machine or machines in which certain aspects of the inventive concept may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the inventive concept may include a tangible, non-transitory machine-readable medium comprising instructions executable by one or more processors, the instructions comprising instructions to perform the elements of the inventive concepts as described herein.

Having described and illustrated the principles of the inventive concept with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms may reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the inventive concept may extend to the following statements, without limitation:

Statement 1. An embodiment of the inventive concept includes a device, comprising:

a connector to connect the device to a chassis;

chassis type circuitry to determine a type of the chassis including the device; and mode configuration circuitry to configure the device to use a first mode or a second mode responsive to the type of the chassis.

Statement 2. An embodiment of the inventive concept includes a device according to statement 1, further comprising storage for data.

Statement 3. An embodiment of the inventive concept includes a device according to statement 1, wherein the chassis type circuitry is operative to determine the type of the chassis by reading a Vital Product Data (VPD) from an address in an Electrically Erasable Programmable Read-Only Memory (EEPROM).

Statement 4. An embodiment of the inventive concept includes a device according to statement 1, wherein the chassis type circuitry is operative to determine the type of the chassis from a signal on a pin on the connector.

Statement 5. An embodiment of the inventive concept includes a device according to statement 4, wherein the pin on the connector includes a General Purpose Input/Output (GPIO) pin on the connector.

Statement 6. An embodiment of the inventive concept includes a device according to statement 1, wherein the mode configuration circuitry is operative to configure the device to use the first mode if the chassis type circuitry is unable to determine the type of the chassis.

Statement 7. An embodiment of the inventive concept includes a device according to statement 1, wherein:
the first mode includes a Non-Volatile Memory Express (NVMe) protocol to communicate between the device and the chassis; and
the second mode includes a Non-Volatile Memory Express Over Fabric (NVMeoF) protocol to communicate between the device and the chassis.

Statement 8. An embodiment of the inventive concept includes a device according to statement 7, wherein the NVMeoF protocol includes logic to exchange data between the device and the chassis using a protocol drawn from a set including Ethernet, InfiniBand, and Fibre Channel.

Statement 9. An embodiment of the inventive concept includes a device according to statement 7, wherein:
the connector supports a plurality of Peripheral Component Interconnect Express (PCIe) lanes and Serial Attached Small Computer System Interface (SCSI) (SAS) pins.

Statement 10. An embodiment of the inventive concept includes a device according to statement 9, wherein the connector includes a U.2 connector.

Statement 11. An embodiment of the inventive concept includes a device according to statement 9, wherein, if the type of the chassis is NVMe, the mode configuration circuitry is operative to use a first two lanes of the PCIe lanes as both a first data plane and a first control plane for a first host and to disable use of an Ethernet port via the SAS pins.

Statement 12. An embodiment of the inventive concept includes a device according to statement 9, wherein, if the type of the chassis is NVMeoF, the mode configuration circuitry is operative to use a first two lanes of the PCIe lanes as a first control plane for a first host, and to use a first set of SAS pins as a first Ethernet port for a first data plane.

Statement 13. An embodiment of the inventive concept includes a device according to statement 9, wherein the chassis type circuitry is operative to determine if the type of the chassis is a High Availability (HA) chassis.

Statement 14. An embodiment of the inventive concept includes a device according to statement 13, wherein, if the type of the chassis is NVMe, the mode configuration circuitry is operative to use a second two lanes of the PCIe lanes as both a second data plane and a second control plane for a second host and to disable use of an Ethernet port via the SAS pins.

Statement 15. An embodiment of the inventive concept includes a device according to statement 13, wherein, if the type of the chassis is NVMeoF, the mode configuration circuitry is operative to use a second two lanes of the PCIe lanes as a second control plane for a second host, and to use a second set of SAS pins as a second Ethernet port for a second data plane.

Statement 16. An embodiment of the inventive concept includes a method, comprising:
determining a type of chassis in which a device is installed; and
configuring the device to enable a first communication mechanism and disable a second communication mechanism for the device according to the type of the chassis.

Statement 17. An embodiment of the inventive concept includes a method according to statement 16, wherein determining a type of chassis in which a device is installed includes accessing the type of the chassis from a Vital Product Data in an Electrically Erasable Programmable Read-Only Memory (EEPROM).

Statement 18. An embodiment of the inventive concept includes a method according to statement 16, wherein determining a type of chassis in which a device is installed includes accessing a signal from a pin on a connector coupled to the device.

Statement 19. An embodiment of the inventive concept includes a method according to statement 18, wherein accessing a signal from a pin on a connector coupled to the device includes accessing the signal from a General Purpose Input/Output (GPIO) pin on the connector coupled to the device.

Statement 20. An embodiment of the inventive concept includes a method according to statement 16, wherein determining a type of chassis in which a device is installed includes determining whether the type of chassis is a Non-Volatile Memory Express (NVMe) chassis or a Non-Volatile Memory Express over Fabrics (NVMeoF) chassis.

Statement 21. An embodiment of the inventive concept includes a method according to statement 20, wherein determining whether the type of chassis is a Non-Volatile Memory Express (NVMe) chassis or a Non-Volatile Memory Express over Fabrics (NVMeoF) chassis includes defaulting the type of chassis to the NVMe chassis if the device may not determine the type of the chassis.

Statement 22. An embodiment of the inventive concept includes a method according to statement 20, wherein configuring the device to enable a first communication mechanism and disable a second communication mechanism for the device according to the type of the chassis includes, if the type of the chassis is the NVMe chassis:
enabling the device to use two lanes in a Peripheral Component Interconnect Express (PCIe) bus as both a first data plane and a first control plane for a first host; and
disabling the device from using an Ethernet port on the device for the first host.

Statement 23. An embodiment of the inventive concept includes a method according to statement 22, wherein:
determining a type of chassis in which a device is installed further includes determining whether the type of the chassis is a High Availability (HA) chassis; and
the method further comprises determining whether the device is a HA device.

Statement 24. An embodiment of the inventive concept includes a method according to statement 23, wherein, configuring the device to enable a first communication mechanism and disable a second communication mechanism for the device according to the type of the chassis includes, if the type of the chassis is a HA chassis and the device is a HA device:

enabling a second two lanes in a Peripheral Component Interconnect Express (PCIe) bus as both a second data plane and a second control plane for a second host.

Statement 25. An embodiment of the inventive concept includes a method according to statement 23, further comprising, if the type of the chassis is a HA chassis and the device is not a HA device, reporting a warning.

Statement 26. An embodiment of the inventive concept includes a method according to statement 20, wherein configuring the device to enable a first communication mechanism and disable a second communication mechanism for the device according to the type of the chassis includes, if the type of the chassis is the NVMeoF chassis:

enabling a first two lanes in a Peripheral Component Interconnect Express (PCIe) bus as a first control plane for a first host;

enabling a first Ethernet port on the device as a first data plane for the first host; and disabling the lanes in the PCIe bus as the first data plane for the first host.

Statement 27. An embodiment of the inventive concept includes a method according to statement 26, wherein enabling an Ethernet port on the device as a first data plane for the first host includes using a first pair of SAS pins on a connector coupled to the device as the first Ethernet port.

Statement 28. An embodiment of the inventive concept includes a method according to statement 26, wherein:

determining a type of chassis in which a device is installed further includes determining whether the type of the chassis is a High Availability (HA) chassis; and the method further comprises determining whether the device is a HA device.

Statement 29. An embodiment of the inventive concept includes a method according to statement 28, wherein, configuring the device to enable a first communication mechanism and disable a second communication mechanism for the device according to the type of the chassis includes, if the type of the chassis is a HA chassis and the device is a HA device:

enabling a second two lanes in a Peripheral Component Interconnect Express (PCIe) bus as a second control plane for a second host; and enabling a second Ethernet port on the device as a second data plane for the second host.

Statement 30. An embodiment of the inventive concept includes a method according to statement 29, wherein enabling a second Ethernet port on the device as a second data plane for the second host includes using a second pair of SAS pins on a connector coupled to the device as the second Ethernet port.

Statement 31. An embodiment of the inventive concept includes a method according to statement 28, further comprising, if the type of the chassis is a HA chassis and the device is not a HA device, reporting a warning.

Statement 32. An embodiment of the inventive concept includes an article, comprising a tangible storage medium, the tangible storage medium having stored thereon non-transitory instructions that, when executed by a machine, result in:

determining a type of chassis in which a device is installed; and configuring the device to enable a first communication mechanism and disable a second communication mechanism for the device according to the type of the chassis.

Statement 33. An embodiment of the inventive concept includes an article according to statement 32, wherein determining a type of chassis in which a device is installed includes accessing the type of the chassis from a Vital Product Data in an Electrically Erasable Programmable Read-Only Memory (EEPROM).

Statement 34. An embodiment of the inventive concept includes an article according to statement 32, wherein determining a type of chassis in which a device is installed includes accessing a signal from a pin on a connector coupled to the device.

Statement 35. An embodiment of the inventive concept includes an article according to statement 34, wherein accessing a signal from a pin on a connector coupled to the device includes accessing the signal from a General Purpose Input/Output (GPIO) pin on the connector coupled to the device.

Statement 36. An embodiment of the inventive concept includes an article according to statement 32, wherein determining a type of chassis in which a device is installed includes determining whether the type of chassis is a Non-Volatile Memory Express (NVMe) chassis or a Non-Volatile Memory Express over Fabrics (NVMeoF) chassis.

Statement 37. An embodiment of the inventive concept includes an article according to statement 36, wherein determining whether the type of chassis is a Non-Volatile Memory Express (NVMe) chassis or a Non-Volatile Memory Express over Fabrics (NVMeoF) chassis includes defaulting the type of chassis to the NVMe chassis if the device may not determine the type of the chassis.

Statement 38. An embodiment of the inventive concept includes an article according to statement 36, wherein configuring the device to enable a first communication mechanism and disable a second communication mechanism for the device according to the type of the chassis includes, if the type of the chassis is the NVMe chassis:

enabling the device to use two lanes in a Peripheral Component Interconnect Express (PCIe) bus as both a first data plane and a first control plane for a first host; and disabling the device from using an Ethernet port on the device for the first host.

Statement 39. An embodiment of the inventive concept includes an article according to statement 38, wherein:

determining a type of chassis in which a device is installed further includes determining whether the type of the chassis is a High Availability (HA) chassis; and the method further comprises determining whether the device is a HA device.

Statement 40. An embodiment of the inventive concept includes an article according to statement 39, wherein, configuring the device to enable a first communication mechanism and disable a second communication mechanism for the device according to the type of the chassis includes, if the type of the chassis is a HA chassis and the device is a HA device:

enabling a second two lanes in a Peripheral Component Interconnect Express (PCIe) bus as both a second data plane and a second control plane for a second host.

Statement 41. An embodiment of the inventive concept includes an article according to statement 39, the tangible storage medium having stored thereon further non-transitory instructions that, when executed by the machine, result in, if the type of the chassis is a HA chassis and the device is not a HA device, reporting a warning.

Statement 42. An embodiment of the inventive concept includes an article according to statement 36, wherein configuring the device to enable a first communication mechanism and disable a second communication mechanism for the device according to the type of the chassis includes, if the type of the chassis is the NVMeoF chassis:

enabling a first two lanes in a Peripheral Component Interconnect Express (PCIe) bus as a first control plane for a first host;

enabling a first Ethernet port on the device as a first data plane for the first host; and disabling the lanes in the PCIe bus as the first data plane for the first host.

Statement 43. An embodiment of the inventive concept includes an article according to statement 42, wherein enabling an Ethernet port on the device as a first data plane for the first host includes using a first pair of SAS pins on a connector coupled to the device as the first Ethernet port.

Statement 44. An embodiment of the inventive concept includes an article according to statement 42, wherein:

determining a type of chassis in which a device is installed further includes determining whether the type of the chassis is a High Availability (HA) chassis; and the method further comprises determining whether the device is a HA device.

Statement 45. An embodiment of the inventive concept includes an article according to statement 44, wherein, configuring the device to enable a first communication mechanism and disable a second communication mechanism for the device according to the type of the chassis includes, if the type of the chassis is a HA chassis and the device is a HA device:

enabling a second two lanes in a Peripheral Component Interconnect Express (PCIe) bus as a second control plane for a second host; and enabling a second Ethernet port on the device as a second data plane for the second host.

Statement 46. An embodiment of the inventive concept includes an article according to statement 45, wherein enabling a second Ethernet port on the device as a second data plane for the second host includes using a second pair of SAS pins on a connector coupled to the device as the second Ethernet port.

Statement 47. An embodiment of the inventive concept includes an article according to statement 44, the tangible storage medium having stored thereon further non-transitory instructions that, when executed by the machine, result in, if the type of the chassis is a HA chassis and the device is not a HA device, reporting a warning.

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:

1. A storage device, comprising:
    a connector to connect the storage device to a chassis, the connector supporting a plurality of Peripheral Component Interconnect Express (PCIe) lanes and Serial Attached Small Computer System Interface (SCSI) (SAS) pins;
    chassis type circuitry to determine a type of the chassis including the storage device; and
    mode configuration circuitry to configure the storage device to use a first mode or a second mode responsive to the type of the chassis,
    wherein the first mode includes a Non-Volatile Memory Express (NVMe) protocol to communicate between the storage device and the chassis, and
    wherein the second mode includes a Non-Volatile Memory Express over Fabric (NVMeoF) protocol to communicate between the storage device and the chassis.

2. The storage device according to claim 1, wherein the chassis type circuitry is operative to determine the type of the chassis from a signal on a pin on the connector.

3. The storage device according to claim 1, wherein the connector includes a U.2 connector.

4. The storage device according to claim 1, wherein, based at least in part on the type of the chassis being NVMe, the mode configuration circuitry is operative to use a first two lanes of the PCIe lanes as both a first data plane and a first control plane for a first host and to disable use of an Ethernet port via the SAS pins.

5. The storage device according to claim 1, wherein, based at least in part on the type of the chassis being NVMeoF, the mode configuration circuitry is operative to use a first two lanes of the PCIe lanes as a first control plane for a first host, and to use a first set of SAS pins as a first Ethernet port for a first data plane.

6. The storage device according to claim 1, wherein the chassis type circuitry is operative to determine whether the type of the chassis is a High Availability (HA) chassis.

7. The storage device according to claim 6, wherein, based at least in part on the type of the chassis being NVMe, the mode configuration circuitry is operative to use a second two lanes of the PCIe lanes as both a second data plane and a second control plane for a second host and to disable use of an Ethernet port via the SAS pins.

8. The storage device according to claim 6, wherein, based at least in part on the type of the chassis being NVMeoF, the mode configuration circuitry is operative to use a second two lanes of the PCIe lanes as a second control plane for a second host, and to use a second set of SAS pins as a second Ethernet port for a second data plane.

9. A method, comprising:
    determining a type of chassis in which a storage device is installed, including determining whether the type of chassis is a Non-Volatile Memory Express (NVMe) chassis or a Non-Volatile Memory Express over Fabrics (NVMeoF) chassis; and
    configuring the storage device to enable a first communication mechanism and disable a second communication mechanism for the storage device according to the type of the chassis,
    wherein the storage device is coupled to the chassis using a connector supporting a plurality of Peripheral Component Interconnect Express (PCIe) lanes and Serial Attached Small Computer System Interface (SCSI) (SAS) pins.

10. The method according to claim 9, wherein determining a type of chassis in which a storage device is installed includes accessing a signal from a pin on the connector.

11. The method according to claim 9, wherein configuring the storage device to enable a first communication mechanism and disable a second communication mechanism for the storage device according to the type of the chassis includes, based at least in part on the type of the chassis being the NVMe chassis:

enabling the storage device to use two lanes in a Peripheral Component Interconnect Express (PCIe) bus as both a first data plane and a first control plane for a first host; and disabling the storage device from using an Ethernet port on the storage device for the first host.

12. The method according to claim 11, wherein:
   determining a type of chassis in which a storage device is installed further includes determining whether the type of the chassis is a High Availability (HA) chassis; and
   the method further comprises determining whether the storage device is a HA storage device.

13. The method according to claim 12, wherein, configuring the storage device to enable a first communication mechanism and disable a second communication mechanism for the storage device according to the type of the chassis includes, based at least in part on the type of the chassis being a HA chassis and the storage device being a HA storage device:
   enabling a second two lanes in a Peripheral Component Interconnect Express (PCIe) bus as both a second data plane and a second control plane for a second host.

14. The method according to claim 9, wherein configuring the storage device to enable a first communication mechanism and disable a second communication mechanism for the storage device according to the type of the chassis includes, based at least in part on the type of the chassis being the NVMeoF chassis:
   enabling a first two lanes in a Peripheral Component Interconnect Express (PCIe) bus as a first control plane for a first host;
   enabling a first Ethernet port on the storage device as a first data plane for the first host using a first pair of SAS pins on a connector coupled to the storage device as the first Ethernet port; and
   disabling the lanes in the PCIe bus as the first data plane for the first host.

15. The method according to claim 14, wherein:
   determining a type of chassis in which a storage device is installed further includes determining whether the type of the chassis is a High Availability (HA) chassis; and
   the method further comprises determining whether the storage device is a HA storage device.

16. The method according to claim 15, wherein, configuring the storage device to enable a first communication mechanism and disable a second communication mechanism for the storage device according to the type of the chassis includes, based at least in part on the type of the chassis being a HA chassis and the storage device being a HA storage device:
   enabling a second two lanes in a Peripheral Component Interconnect Express (PCIe) bus as a second control plane for a second host; and
   enabling a second Ethernet port on the storage device as a second data plane for the second host.

17. The method according to claim 16, wherein enabling a second Ethernet port on the storage device as a second data plane for the second host includes using a second pair of SAS pins on the connector coupled to the storage device as the second Ethernet port.

18. An article, comprising a tangible non-transitory storage medium, the tangible non-transitory storage medium having stored thereon non-transitory instructions that, when executed by a machine, result in:
   determining a type of chassis in which a storage device is installed, including determining whether the type of chassis is a Non-Volatile Memory Express (NVMe) chassis or a Non-Volatile Memory Express over Fabrics (NVMeoF) chassis; and
   configuring the storage device to enable a first communication mechanism and disable a second communication mechanism for the storage device according to the type of the chassis,
   wherein the storage device is coupled to the chassis using a connector supporting a plurality of Peripheral Component Interconnect Express (PCIe) lanes and Serial Attached Small Computer System Interface (SCSI) (SAS) pins.

* * * * *